This invention relates to frames for eyeglasses, and in a particular sense to eyeglass frames adapted to inhibit fogging or clouding of the lenses by condensed moisture.

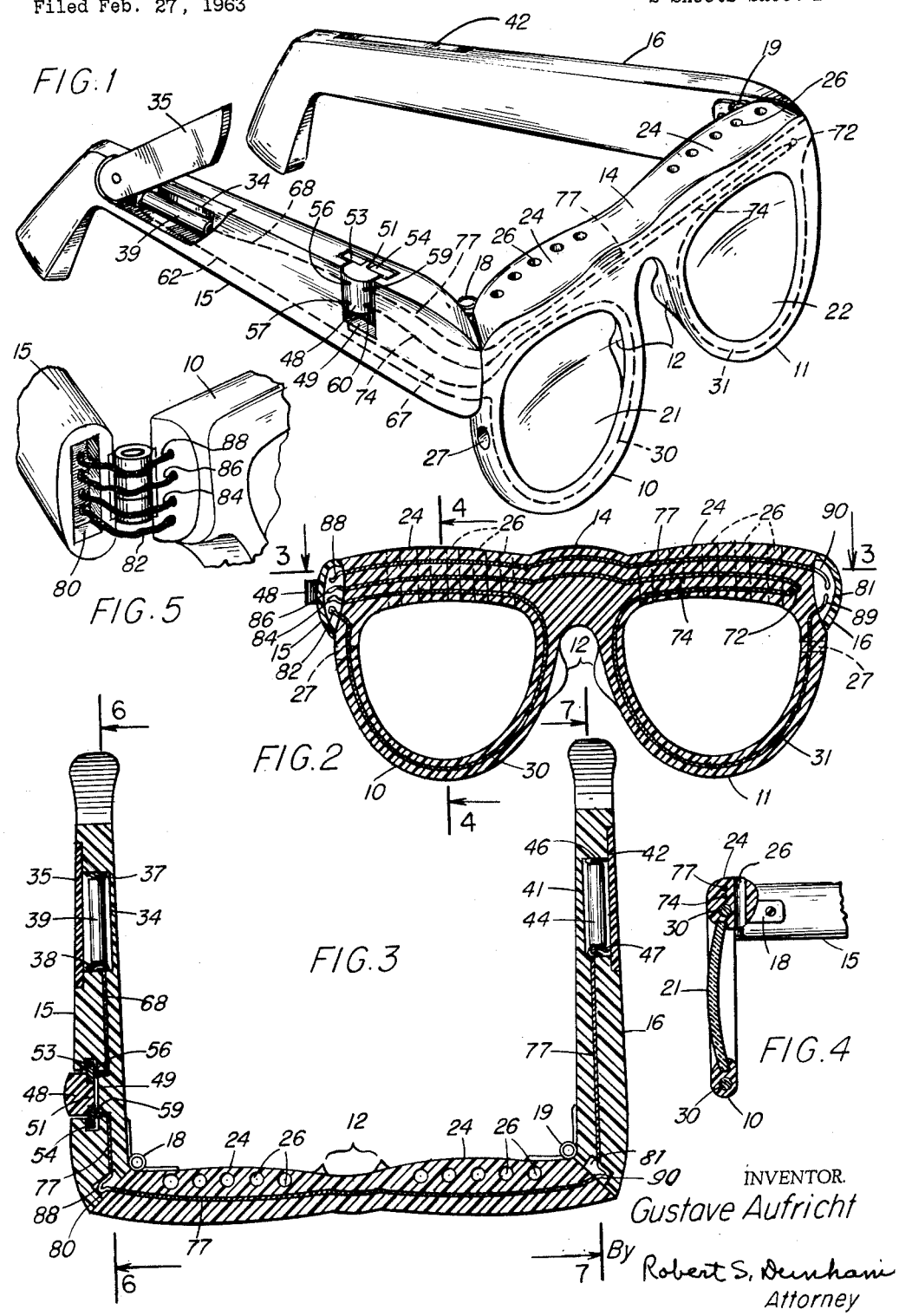
Dec. 8, 1964   G. AUFRICHT   3,160,735
ANTI-FOGGING EYEGLASSES
Filed Feb. 27, 1963   2 Sheets-Sheet 1
INVENTOR.
Gustave Aufricht
By Robert S. Dunham
Attorney Dec. 8, 1964
G. AUFRICHT
3,160,735
ANTI-FOGGING EYEGLASSES
Filed Feb. 27, 1963
2 Sheets-Sheet 2
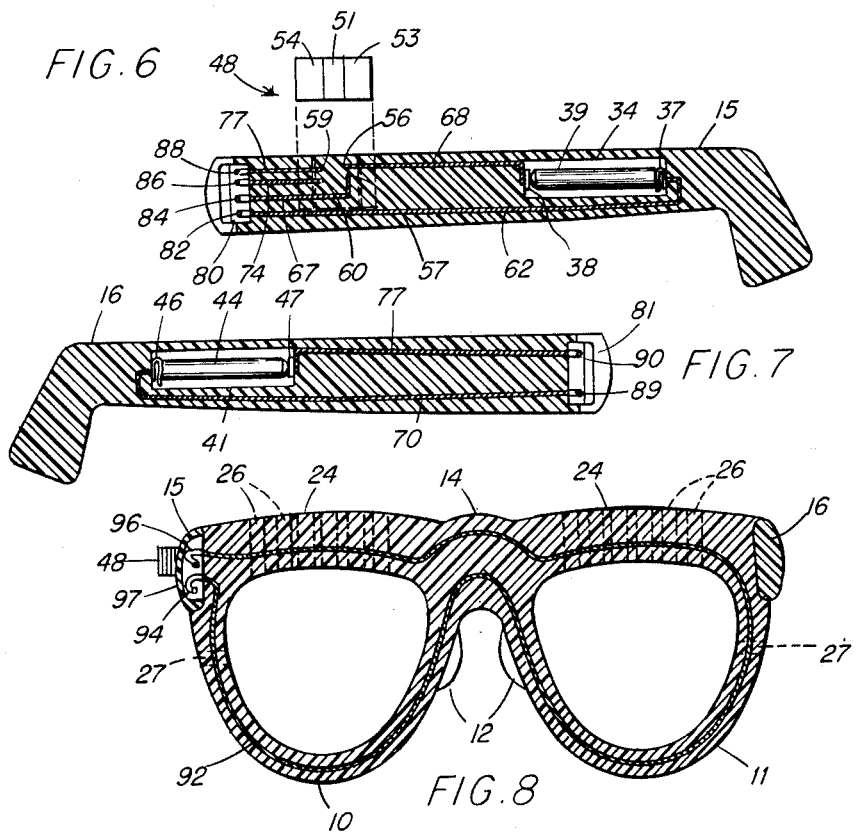
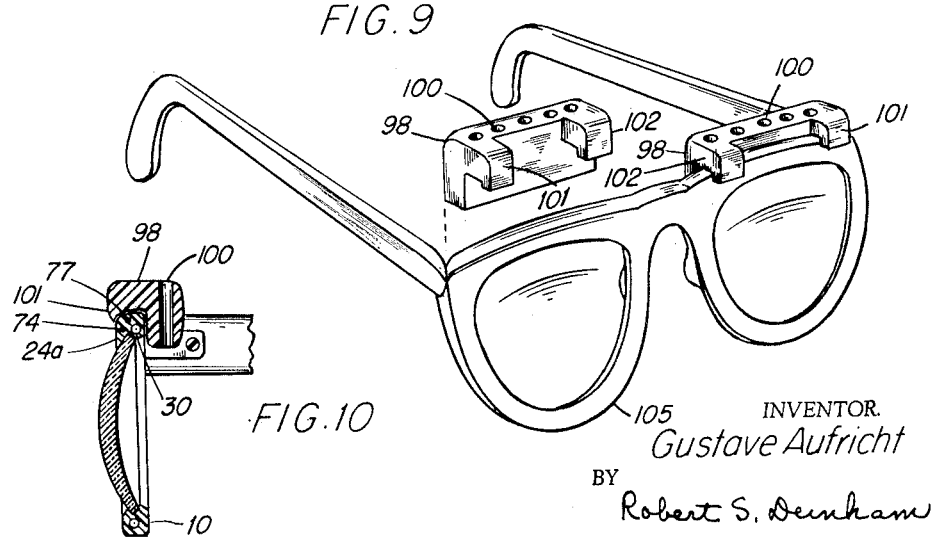
INVENTOR.
Gustave Aufricht
BY
Robert S. Denham
Attorney 3,160,735
ANTI-FOGGING EYEGLASSES
Gustave Aufricht, 1001 Park Ave., New York 28, N.Y.
Filed Feb. 27, 1963, Ser. No. 261,437
7 Claims. (Cl. 219—201)

The fogging of eyeglass lenses is occasioned by a variety of causes, occurring primarily when the surface temperature of the lenses is below the dew point of the circumambient atmosphere. Thus, it is common experience that when a person wearing eyeglasses enters a heated room from a cold outdoor environment, moisture from the warm air of the room may quickly condense on and fog the cold inner lens surfaces, interfering with vision. Another inconvenient instance of such fogging is due to perspiration of the wearer, which causes a local increase of humidity in the preorbital air pocket (the region between the wearer's eye and the lens) that may raise the dew point of the air in such preorbital pocket above the surface temperature of the lens. A particular difficulty in this regard is experienced by surgeons and dentists who are obliged to wear surgical masks while performing operations or treatment. Warm, humid exhaled air escaping upward from the mask enters the preorbital pocket, increasing the humidity therein; perspiration from the skin around the eye may also contribute to such humidity increase. The dew point of the air in the preorbital pocket is thereby raised above the surface temperature of the lens, with the result that moisture condenses on the inner lens surfaces, fogging the glasses. This fogging tendency is enhanced by lack of air circulation in the preorbital pocket.

In a number of situations, such fogging is not only inconvenient but may seriously interfere with the activity in which the wearer is engaged. It can be a very substantial handicap, for example, in the performance of surgical, dental or like tasks involving close manipulations or manual operations over an extended period. Wiping of the glasses would require repeated interruptions of the work and may even be impossible, as when it is necessary to complete some manipulative step of protracted character without interruption. It would therefore be very desirable to provide continuous inhibition of moisture condensation on the lenses, e.g. during such working period, in a manner requiring no attention from the wearer.

Accordingly, an object of the present invention is to provide an eyeglass frame wherein condensation of moisture on the lenses and especially on the inner or eyeward surfaces thereof is prevented, and evaporation of already-condensed moisture promoted, by heating and accelerated ventilation of such surface.

Another object is to provide such eyeglass frame wherein the heating and ventilating actions occur continuously over a desired period without attention from the wearer.

A still further and particularly important object is to provide an eyeglass frame including ventilating means in combination with a heating unit which is compact and entirely self-contained within the frame, for convenience and comfort of the wearer.

To these and other ends, the structure of the present invention in a preferred form contemplates the provision of an eyeglass frame wherein each lens is substantially entirely surrounded by a resistance heating element such as a length of suitable wire, mounted in the frame and energized by a miniature battery carrier by the temporal member of the frame. In addition, the supraorbital portion of the frame is enlarger rearwardly, i.e. in the direction of the wearer's face, above each lens, and these enlarged portions are pierced with a plurality of elongate vertical channels or openings of appropriate configuration to provide a draft or ventilation of air from the preorbital pocket between the eye and the lens. Conveniently, a switch is positioned in the temporal member to control energization of the heating element by the battery, and a subtemporal opening communicating with the preorbital pocket is provided in the frame to aid in ventilation.

With this arrangement of elements, the resistance heating wire serves to maintain the surfaces of the lens at a warm temperature, i.e. a temperature above the dew point of the surrounding air, while the ventilating channels or openings serve to provide an upward draft or current of air to carry away the humid air in the preorbital pocket. As will further be understood, the heating and ventilating elements coact with particular effectiveness. The heating elements, by warming the adjacent lenses, prevent condensation on the lens surfaces and enhance the evaporation of any already-condensed moisture. At the same time, the heating elements warm the air in the vertical ventilation openings, enhancing the updraft of air through the openings and thereby accelerating the ventilation of, and removal of moisture from, the preorbital pocket. The latter result is due to the tendency of warm air to rise and in rising to create a relative vacuum, i.e. such that fresh air is drawn into the preorbital pocket to replace the rising warm, moist air. A special feature of advantage and convenience in the present invention resides in the positioning of the battery or powering means for the heating element in the temporal member of the frame, since the provision of such energizing means in the temporal member makes the frame an entirely self-contained unit requiring no wires or other conductive structure leading to an external power source.

Further features and advantages of the invention will be apparent from the detailed description hereinbelow set forth, together with the accompanying drawings, wherein:

Fig. 1 is a perspective view of an eyeglass frame embodying the present invention in a particular form;

Fig. 2 is a schematic front elevational sectional view of the frame of Fig. 1;

Fig. 3 is a sectional plan view of the frame of Fig. 1, taken as along the plane 3—3 of Fig. 2;

Fig. 4 is a side elevational sectional view of the frame of Fig. 1, taken as along the plane 4—4 of Fig. 2;

Fig. 5 is a perspective view of a portion of the frame of Fig. 1 including the junction between a temporal member and the adjacent lens-holding member;

Fig. 6 is a side elevational sectional view of one temporal member of the frame of Fig. 1, taken as along the plane 6—6 of Fig. 3;

Fig. 7 is a side elevational sectional view of the other temporal member of the frame of Fig. 1, taken as along the plane 7—7 of Fig. 3;

Fig. 8 is a schematic front elevational sectional view of an alternative frame structure embodying the invention;

Fig. 9 is a perspective view of alternative ventilating elements, shown as associated with a conventional eyeglass frame; and Fig. 10 is a side elevational sectional view of a frame of the type illustrated in Figs. 1–7, but with the ventilating element of FIG. 9 substituted for the ventilating arrangement of Figs. 1–7, taken as along the plane 4—4 of Fig. 2.

Referring first to FIG. 1, the frame there shown incorporates conventional features of eyeglass frame construction, including a pair of rims or lens-holding members 10, 11, each defining an opening adapted to receive a lens and bearing on an inner side surface a nose piece 12. The lens-holding members 10, 11 are held in fixed spaced relation, for positioning in front of the respective eyes of the wearer, by a bridge 14 integral with these members. A pair of rearwardly extending temporal members 15, 16 are respectively connected by hinges 18, 19 to the opposite sides of the frontal structure provided by the members 10, 11 and bridge 14, in such manner as to engage the respective sides of the wearer's head to maintain the eyeglasses in position, and to fold in overlapping relation behind the frontal structure when not in use. The several above-described frame elements may conveniently be fabricated of a rigid plastic or like rigid, lightweight substance, and when fitted with lenses 21, 22 provide a complete pair of eyeglasses.

As more particularly shown in FIGS. 2–4, the portion of the lens-holding member 10 above the lens opening (herein referred to as the supraorbital portion) is enlarged vertically and also horizontally in the direction toward the face of the wearer. This portion, designated 24, defines a plurality of axially vertical channels or openings 26 of generally elongated and preferably cylindrical configuration extending upwardly from a locality immediately above the lens 21 adjacent the inner lens surface, i.e. on the side of the lens nearest the face of the wearer. In addition, immediately below the junction of the temporal member 15, the lens-holding member 10 is pierced by one or more further openings 27 extending in generally transverse direction to the preorbital pocket behind the lens. The supraorbital openings 26 serve to increase ventilation of the pocket of air between the eye of the wearer and the lens, and in particular to enhance the upward passage of air currents from the pocket, while the subtemporal opening or openings 27 provide directed inflow of air into the pocket to replace the air withdrawn from the pocket by the updraft through the openings 26. Owing to the aforementioned enlargement of the supraorbital portion 24, the openings 26 may be of comparatively large vertical extent, for optimum updraft effect. It will be understood that the lens-holding member 11 is identical with the member 10, and thus also has an enlarged supraorbital portion 24 pierced by openings 26 as well as one or more subtemporal openings 27, so that similar circulation of air is provided for the preorbital pocket behind the lens 22.

The lens opening of the member 10 is substantially surrounded by a heating element 30 comprising a loop of resistance heating wire embedded in the latter member and adapted to warm the lens 21. As shown in FIG. 4, the portion of the loop above the lens opening passes in front of the ventilation openings 26, i.e. on the side thereof away from the wearer's brow and closest to the lens. An identical heating element 31 is mounted in the lens-holding member 11 in the same manner, to warm the lens 22.

The rearward portion of the temporal member 15 is hollowed out to provide a recess 34 accessible through a displaceable cover plate 35 and arranged to contain one or more miniature batteries of a type effective to energize the heating element 30 for warming the lens 21. Thus, the recess 34 includes a pair of terminal contacts 37, 38, fabricated of spring steel or like conductive material and disposed to engage the positive and negative terminals of such battery or batteries. As shown in FIGS. 3 and 6, the battery, designated 39, is positioned between these contacts in the recess 34. The contacts 37, 38 are connected electrically to the ends of the heating element 30 to provide a circuit including the battery 39 and the latter heating element.

A similar recess 41 is provided in the temporal member 16, accessible through a cover plate 42 and arranged to accommodate one or more batteries of the above-described type for energization of the heating element 31. Such battery, designated 44 in FIGS. 3 and 7, is positioned in this recess between terminal contacts 46, 47, which are connected electrically to the ends of the heating element 31 to provide a circuit including this element and the battery 44.

Energization of the two heating elements 30, 31 by their respective batteries 39, 44 is controlled by a single switch 48, mounted and vertically displaceable within a recess 49 in the temporal member 15. This switch, which includes a nonconductive body 51, bears on its inner face a pair of spaced, vertically oriented conductive plates 53, 54, composed for example of a suitable metal and insulated from one another by a portion of the nonconductive body 51, as shown in FIGS. 3 and 6. Projecting through the rear of the recess 49 are a pair of vertically spaced contact points 56, 57, connected in the circuit of the battery 39 and heating element 30, and positioned to engage the conductive plate 53 simultaneously when the switch 48 is in an upper position in the recess 49. A second pair of vertically spaced contact points 59, 60, connected in the circuit of the battery 44 and heating element 31, also project through the rear of the recess 49 and are positioned to engage the conductive plate 54 simultaneously when the switch 48 is in the latter upper position.

With the switch in such upper position, as will be appreciated, the plate 53 connects the points 56, 57 electrically to close the circuit of the battery 39 and heating element 30; at the same time, the plate 54 connects the points 59, 60 to close the circuit of the battery 44 and heating element 31. Thus current can flow from the batteries to the respective heating elements, energizing the elements to warm the respective lenses 21, 22. When the switch is at a lower position in the region 49, however, the plate 53 no longer engages both points 56, 57, and the plate 54 no longer engages both points 59, 60; hence the respective heating element-battery circuits are then open between these points, with the result that the heating elements are not energized.

The heating element-battery circuits referred to generally above are particularly exemplified by the wiring arrangements shown in FIG. 1 (by broken lines) and in FIGS. 2, 6 and 7. Referring first to the circuit of battery 39 and heating element 30, a lead wire 62 extends forwardly through the temporal member 15 from the battery terminal contact 37 and through the joint between the latter temporal member and the lens-holding member 10. One end of the heating element 30 is electrically connected to the lead 62. The other end of the element 30 is electrically connected to a lead wire 67 which extends through the aforementioned joint and through the temporal member 15 to the switch contact point 57. Finally, the switch contact point 56 is connected to the battery terminal contact 38 by a lead wire 68 also mounted in the temporal member 15.

Referring now to the circuit of battery 44 and heating element 31, a lead wire 70 extends forwardly through the temporal member 16 from the battery terminal contact 46 to connect with one end of the element 31 in the lens-holding member 11. The other end of the heating element 31 is soldered at 72 to a lead 74. This lead extends entirely across the frontal portion of the eyeglass frame, above the lens openings of both members 11, 10, through the joint between the lens-holding member 10 and temporal member 15, and thence through the temporal member 15 to terminate at the switch contact point 60. A further lead 77 extends forwardly through the temporal member 15 from the switch contact point 59, through the latter joint, and thence extends entirely across the frontal portion of the eyeglass frame (above the lead 74) to the joint between the lens-holding member 11 and temporal member 16. From the latter joint, the lead 77 continues through the temporal member 16 to terminate at the battery terminal contact 47. It will be appreciated that the leads 74, 77 serve to connect the circuit of the battery 44 and heating element 31 to the switch contact points 59, 60 in the temporal member 15, so that the closing of the latter circuit, as well as the closing of the circuit of heating element 30 and battery 39, may be controlled by the single switch 62.

At the points where the several leads referred to above pass through the junctions between the temporal members and the adjacent lens-holding members of the eyeglass frame, it is necessary that the leads be sufficiently flexible to permit pivotal movement of the temporal members, i.e. between the open position they assume when the glasses are worn and their folded, overlapping position. Accordingly, the portions of the leads at such junctions may conveniently be provided by lengths of flexible, insulated wire of sufficient extent to reach between the forward extremities of the temporal members and the adjacent surfaces of the respective lens-holding members when the temporal members are folded. The latter extremities of the temporal members 15, 16 may further conveniently have recesses (respectively designated 80, 81 in FIG. 3) into which these flexible insulated wire portions fit when the temporal members are in open position, so that the latter wire portions do not interfere with smooth abutment of the temporal and lens-holding members. Thus, as shown in FIGS. 2, 5, and 6, the portions of the leads 62, 67, 74 and 77 extending through the joint between the temporal member 15 and lens-holding member 10 are provided by respective insulated wires 82, 84, 86, and 88. The portions of the leads 70, 77 extending between the temporal member 16 and lens-holding member 11 may be provided by similar lengths of insulated wire, respectively designated 89, 90 in FIGS. 2 and 7.

In the light of the foregoing description, the functioning of the present structure will now be readily understood. Assuming that the switch 48 is in circuit-closing position, current will flow from the batteries 39, 44 to energize the respective heating elements 30, 31 surrounding the lenses 21, 22. Thereby, the surfaces of the lenses will be warmed and, if the glasses are being worn, this warming will serve to maintain the lens surfaces above the dew point of the humid atmosphere in the preorbital pocket. At the same time, air entering the preorbital pocket below the lens-holding members 10, 11 and through the openings 27 will pass upwardly through the openings 26 to create currents of air ventilating the pocket and carrying humid air therefrom to decrease the humidity of the pocket.

To this ventilation effect the heating elements surrounding the lenses contribute, in that they cause local warming of the air adjacent the lens-holding members 10, 11 with the result that such warmed air rises, i.e. to and through the openings 26. As will be noted, especially in FIGS. 2 and 4, the upper or supraorbital extensions of the heating elements 30, 31 are positioned in front of the openings 26 and in proximate relation thereto. This arrangement provides further localized warming of the air in the openings 26 which accelerates its upward movement to facilitate ventilation.

In such manner moisture present and increased by evaporation of perspiration in the preorbital pockets is rapidly and effectively removed from the regions adjacent the inner surfaces of the lens, to prevent accumulation and condensation of moisture thereon, while the lenses themselves are warmed to a temperature above the dew point of the humid atmosphere surrounding their inner surfaces. At the same time, the warming and ventilation promote evaporation of any moisture which may have already condensed on the lenses, e.g. prior to energization of the heating elements. In other words, then, the heating and ventilation serve to provide simultaneous de-fogging and anti-fogging action. The warming is of course also effective to maintain the temperature of the outer surfaces of the lenses above the dew point of the circumambient air, thereby inhibiting condensation of moisture on these surfaces as well.

Thus fog-free vision is provided with a compact, self-contained eyeglass frame which is comparable in size and weight to an ordinary frame and accordingly is especially convenient and comfortable for use. To obtain such fog-free vision for any desired period of time the wearer need only move the switch on the temporal member 15 to the circuit-closing position; thereafter a continuous flow of current from the batteries in the temporal members will maintain the heating elements energized for continuous warming of the lenses while the continuous ventilation of the preorbital pockets, enhanced by such warming, will contribute as described above to the fog-inhibiting action.

An alternative embodiment of the invention is illustrated in FIG. 8, wherein there is shown in front elevational section an eyeglass frame again comprising lens-holding members 10, 11 held in fixed spaced relation by a bridge 14 and having nose pieces 12, with temporal members 15, 16 respectively extending from opposite sides of the structure formed by the members 10, 11 and the bridge 14. As before, in the structure of FIG. 8 the supraorbital portions 24 of the lens-holding members 10, 11 are enlarged in a vertical and horizontal direction, and are pierced by a plurality of elongate axially vertical openings 26, while the subtemporal portions of the lens-holding members are respectively pierced by generally transverse openings 27 identical with those described above.

In this embodiment, however, a single heating element is used, comprising a loop of resistance-heating wire 92 extending substantially around the lens openings of both members 10, 11 in the manner shown, i.e. passing through the bridge portion 14. The ends of this loop of resistance heating wire respectively terminate in leads represented by insulated wires 94, 96, extending through the joint between the member 10 and the temporal member 15 and fitting into a recess 97 in the forward extremity of the latter temporal member. These wires correspond to the wires 82, 84 in the embodiment of FIGS. 1–7 described above. The temporal member 15, as before, carries a battery positioned in a recess between battery terminal contacts which are connected (through the leads represented by the wires 94, 96) to the ends of the element 92; in this case, however, the latter battery serves to energize the single heating element for both members 10, 11 and the switch 48 controls the single circuit of this battery and heating element, no battery being provided in the temporal member 16. This structure, as will be appreciated, has certain advantages over that of FIGS. 1–7, in that the entire heating of both lens-holding members is provided with a single battery (simplifying the wiring arrangement), although of course a more powerful battery is needed than those required in the latter embodiment. In function, of course, the structure of FIG. 8 is substantially identical with that of FIGS. 1–7.

Alternatively, the heating element arrangement of FIG. 8 may be modified for energization by batteries carried in both temporal members 15, 16. That is to say, the element 92 (connected at its ends in the lens-holding member 10 to a switch and battery in the temporal member 15 as described above) may also be open in the lens-holding member 11, to provide two additional heating element terminals, adjacent the temporal member 16. The member 16 is then arranged (as in FIGS. 3 and 7) to carry a battery positioned in a recess between battery terminal contacts connected to the latter heating element terminals by a pair of leads extending forwardly through the member 16 to the lens-holding member 11. In such manner, the heating element 92, the switch, and a pair of batteries (or sets of batteries) respectively carried by the temporal members 15, 16 are connected in series in a single circuit, providing in effect a simplified wiring arrangement for the two-battery embodiment of FIGS. 1–7.

Referring now to FIGS. 9–10, there is shown a further embodiment of the invention including a form of ventilating structure alternative to the enlarged supraorbital frame portions 24 of the embodiments of FIGS. 1–8. This alternative ventilating structure comprises an element or grill 98, fabricated of any convenient rigid solid material such as a plastic or metal, and defining a plurality of elongate cylindrical channels or openings 100. The grill 98 further includes structure (represented by a pair of horizontally projecting hooks 101, 102) adapted to engage the supraorbital portion of a conventionally-shaped eyeglass frame, for stable support of the grill on the frame. As shown, the hooks 101, 102 are disposed so that when the grill is mounted on an eyeglass frame the main body of the grill extends rearwardly and upwardly from the supraorbital portion of the frame, with the openings 100 extending vertically upwardly from a locality immediately above the rearward side of the adjacent lens.

In other words, the grill 98 constitutes a detachable ventilating element providing supraorbital openings 100 which correspond in arrangement and function with the openings 26 of FIGS. 1–8, serving to enhance ventilation of the preorbital pocket by increasing the updraft of air therefrom. One of such grill structures is positioned over each lens of a complete pair of eyeglasses. Since these grills 98 are detachable, they can be used with an ordinary eyeglass frame (such as the frame 105 of FIG. 9) to provide the ventilation-enhancing feature of the present invention, simply by mounting a pair of the grills on the respective supraorbital portions of the frame. That is to say, the grills 98 may be employed to provide enhanced ventilation for an ordinary pair of eyeglasses, e.g. temporarily, as when fogging is expected incident to some particular activity of the wearer.

The grills 98 may also be used to constitute the ventilating elements in the complete heating element-ventilating element combination of the present invention. Thus, a frame may be constructed identical with the structure of FIGS. 1–7 in respect of the arrangement of heating elements and batteries, but lacking the enlarged supraorbital portions 24 and having instead a supraorbital portion 24a (over each lens) of conventional dimensions, in which the upper extensions of the respective heating elements 30, 31 and the leads 74, 77 are mounted, as illustrated in FIG. 10. The ventilating elements for this latter frame are supplied by mounting one of the grills 98 on each supraorbital frame portion 24a, as further shown in FIG. 10. When the grill is in position (e.g. on the lens-holding member 10), the upper extension of the heating element 30 passes forwardly of the openings 100, i.e. it bears the same structural relation to the latter openings as it does to the openings 26 in FIGS. 1–8. In consequence, the same cooperative effect of the heating and ventilating elements is attained; specifically, the elements 30, 31 not only warm the surfaces of the adjacent lenses to prevent condensation, but also warm the air in the openings 100 to accelerate the updraft of air therein, for enhanced ventilation of the preorbital pocket.

It is to be understood that the invention is not limited to the specific features and embodiments hereinabove set forth, but may be carried out in other ways without departure from its spirit.

I claim:
1. In a frame for eyeglasses, in combination, a lens-holding member defining a frame opening shaped to receive a lens, a resistance heating element for warming the surfaces of said lens to inhibit condensation of moisture thereon substantially surrounding said opening and carried by said lens-holding member, a temporal member extending rearwardly from one side of said lens-holding member and having a portion adapted to carry a battery, and contact means carried by said temporal member, positioned to engage the terminals of said battery in said last-mentioned portion and connected to said resistance heating element for energization of said element by said battery.

2. In a frame for eyeglasses, in combination, a lens-holding member defining a frame opening shaped to receive a lens and having an enlarged supraorbital portion having a plurality of ventilation openings extending upwardly from said frame opening on the rearward side thereof, a resistance heating element for warming the surfaces of said lens to inhibit condensation of moisture thereon, substantially surrounding said frame opening and carried by said lens-holding member, a temporal member extending rearwardly from one side of said lens-holding member and having a portion adapted to carry a battery, and contact means carried by said temporal member, positioned to engage the terminals of said battery in said last-mentioned portion and connected to said resistance heating element for energization of said element by said battery.

3. In a frame for eyeglasses, in combination, a lens-holding member defining a frame opening shaped to receive a lens, an electrical resistance heating element for warming the surfaces of said lens to inhibit condensation of moisture thereon, substantially surrounding said frame opening and carried by said lens-holding member, a temporal member extending rearwardly from one side of said lens-holding member, a battery carried by said temporal member, and means connecting the terminals of said battery electrically with said resistance heating element.

4. In a frame for eyeglasses, in combination, a lens-holding member defining a frame opening shaped to receive a lens and having an enlarged supraorbital portion having a plurality of ventilation openings extending upwardly from said frame opening on the rearward side thereof, an electrical resistance heating element for warming the surfaces of said lens to inhibit condensation of moisture thereon, substantially surrounding said frame opening and carried by said lens-holding member and having a supraorbital extension mounted forwardly of said ventilation openings, a temporal member extending rearwardly from one side of said lens-holding member, a battery mounted in said temporal member, means connecting the terminals of said battery electrically with said resistance heating element, and a switch connected in the circuit of said battery and said resistance heating element to control energization of said element by said battery.

5. Structure as defined in claim 4, wherein said lens-holding member has at least one supplemental ventilation opening extending inwardly from a subtemporal locality adjacent said temporal member to a locality rearward of and adjacent to said frame opening.

6. A frame for eyeglasses, comprising, in combination, a pair of lenses, a pair of lens-holding members respectively supporting and surrounding said lenses, said lens-holding members being connected by a bridge portion integral therewith in substantially coplanar spaced relation to each other and each having an enlarged supraorbital portion having a plurality of ventilation openings extending upwardly from said respective lenses on the rearward side thereof, resistance heating element means for warming the surfaces of said lens to inhibit condensation of moisture thereon mounted in said lens-holding members and substantially surrounding each of said lenses and having supraorbital extensions respectively mounted forwardly of said ventilation openings, a pair of temporal members respectively extending rearwardly from the respective opposite sides of said lens-holding members, battery means mounted in at least one of said temporal members, means connecting said battery means electrically with said resistance heating element means, and switch means mounted in one of said temporal members and connected in the circuit of said heating element means and said battery means for controlling energization of said heating element means by said battery means.

7. A detachable ventilating element for eyeglasses, comprising a body having a plurality of elongate, substantially axially parallel ventilation openings and including a hook member extending forwardly from said ventilation openings in a direction transverse to the axes of said openings and adapted to seat on the supraorbital portion of an eyeglass frame for support of said body on said frame adjacent said supraorbital portion with said openings extending substantially vertically upward on the rearward side of said supraorbital portion.

References Cited in the file of this patent

UNITED STATES PATENTS

| | | |
|---|---|---|
| 669,949 | Underwood | Mar. 12, 1901 |
| 1,816,752 | Tully | July 28, 1931 |
| 1,963,990 | Gilkeson | June 26, 1934 |
| 2,207,705 | Cox | July 16, 1940 |
| 2,725,462 | Vorgang | Nov. 29, 1955 |
| 2,830,132 | Borg | Apr. 8, 1958 |
| 3,015,987 | Harrison | Jan. 9, 1962 |

FOREIGN PATENTS

| | | |
|---|---|---|
| 380,263 | Germany | Sept. 1, 1937 |